Patented July 31, 1945

2,380,426

UNITED STATES PATENT OFFICE 2,380,426

POLYMERIZATION OF CONJUGATED DIENE HYDROCARBONS

Charles F. Fryling, Silver Lake, Ohio, assignor to The B. F. Goodrich Company, New York, N. Y., a corporation of New York No Drawing. Application May 31, 1941, Serial No. 396,155

14 Claims. (Cl. 260—84.5)

This invention relates to the polymerization of butadiene hydrocarbons, and particularly to a method whereby butadiene hydrocarbons may be polymerized in an aqueous emulsion to form products closely resembling natural crude rubber.

The emulsion polymerization of butadiene hydrocarbons either alone or in admixture with other monomers copolymerizable therewith to form compositions of matter more or less resembling rubber is well known. It has been commonly observed, however, that the products of such polymerization often resemble vulcanized rubber rather than natural crude rubber in respect to solubility, plasticity, and processing characteristics. Thus it has often been found that the polymers were insoluble in, and, in some cases, not even swelled by benzene or acetone, and that they were tough, non-plastic materials which either would not homogenize on a mill or which were very difficult to mill and to subject to other ordinary processing operations.

I have now discovered a class of materials which modifies the emulsion polymerization of butadiene hydrocarbons in such a manner that polymers more nearly resembling natural crude rubber may be produced than when the polymerization is carried on in the absence of the materials of this invention. This class of materials, which I have termed "modifiers," consists of compounds containing the 2-thiothiazyl group which may be represented by the following structural formula:

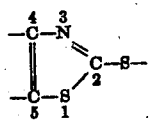

Preferred modifiers include the aliphatic 2-mercaptothiazoles, by which is meant compounds in which the carbon atoms numbered 4 and 5 do not form part of an unsaturated carbocyclic ring, such as 2-mercapto-4-ethylthiazole, 2-mercapto-4-phenylthiazole, 2-mercapto-4,5-dimethylthiazole, 2-mercapto-4-methoxymethylthiazole, and the corresponding bis-thiazyl-2 mono, di-, and polysulfides, the aliphatic bis-thiazyl-2 disulfides producing especially good results. Other compounds which may be employed but which do not in general possess as great activity as the aliphatic 2-mercaptothiazoles include the aromatic 2-mercaptothiazoles, by which is meant compounds in which the carbon atoms numbered 4 and 5 form part of an unsaturated carbocyclic ring, such as 2-mercaptobenzothiazole, 2-mercaptonaphthothiazole, and the corresponding aromatic di-2-thiazyl mono-, di-, and polysulfides. 2-thiazyl sulfides such as 4,5-dimethylthiazyl-2 diethylamino sulfide, benzothiazyl-2 dicyclohexylamino sulfide and other compounds containing the 2-thiothiazyl group may also be employed. While the compounds in which the basicity is increased by the presence of nitrogenous substituents exhibit activity as modifiers, they also retard the polymerization. The retarding action may in general be counteracted, however, by known methods of accelerating polymerization reactions.

The effect of compounds containing the 2-thiothiazyl group on emulsion polymerization is shown by the copolymerization at 30° C. of 55 parts by weight of butadiene and 45 parts of acrylonitrile in the presence of about 250 parts of a 3% solution of myristic acid which had been 85% neutralized with sodium hydroxide, and 0.35 part of hydrogen peroxide as an initiator. Although the polymer obtained by coagulating the latex formed by polymerization in the absence of any modifier was in the form of non-plastic, non-coherent crumbs, the polymer obtained when 0.5 part of 2-mercapto-4-ethylthiazole were present in the emulsion during the polymerization was a soft, plastic, coherent synthetic rubber. When the polymer prepared in the absence of the thiazole was vulcanized in a tire tread test recipe, a vulcanizate exhibiting a tensile strength of 3400–3650 lbs./in.² and an elongation of 250–290% was obtained. The polymer prepared in the presence of 2-mercapto-4-ethylthiazole developed, when tested in the same recipe, a tensile strength of 4400–5500 lbs./in.² and an elongation of 500–630%.

In another specific example, 75 parts by weight of butadiene were copolymerized with 25 parts of acrylonitrile at 30° C., while being agitated in the presence of about 250 parts of a 3% solution of myristic acid which had been 85% neutralized with sodium hydroxide, and 0.35 part of hydrogen peroxide as an initiator. In subsequent polymerizations, 0.4 part of various 2-thiothiazyl compounds were included in the emulsion during the polymerization. The solubilities of the polymers are given in the following table:

| Modifier | Solubility in benzene |
|---|---|
| | Per cent |
| None | 1 |
| 2-mercapto-4,5-dimethylthiazole | 10 |
| 2-mercapto-4-ethylthiazole | 10 |
| 2-mercaptobenzothiazole | 4 |
| Benzothiazyl-2 disulfide | 9 |

The polymers formed in the presence of the 2-thiothiazyl compounds were more coherent than the unmodified polymers, were more easily worked on a mill, and exhibited higher tensile strengths and elongations when tested in tire tread recipe. Similar results are obtained when the modifiers of this invention are employed in the emulsion polymerization of other monomeric systems such as mixtures of butadiene and methyl methacrylate.

The proportion in which the modifier is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or over may advantageously be employed.

Although the exact manner in which the modifiers of this invention function is not understood, it is believed from the nature of the changes in properties effected by polymerizing monomers in the presence of modifying agents that these materials in some way inhibit the formation of cross-linkages but still permit the formation of long, straight chains of polymerizable monomers. It is believed that in the absence of some agent which serves to prevent or inhibit cross-linkage, the products of emulsion polymerizations which have been carried to completion contain numerous cross-linkages which affect the properties of the polymer in much the same manner as the cross-linkages formed during the vulcanization of natural crude rubber with the aid of sulfur change the properties of the crude rubber. This theory explains why the polymers prepared in the presence of modifying agents are in general more plastic and more soluble than unmodified polymers. This theory is presented only by way of explanation and is not intended as a limitation on the invention, for regardless of the correctness of the theory, the inclusion in emulsion polymerization batches of a compound containing a 2-thiothiazyl group produces the beneficial results heretofore described.

The modifying agents of this invention may be employed in the polymerization in aqueous emulsion of butadiene hydrocarbons such as butadiene, 2,3-dimethylbutadiene, isoprene, or piperylene either alone or in admixture with each other or with other monomers copolymerizable therewith. As examples of monomers copolymerizable with butadiene may be mentioned such compounds as styrene, vinyl naphthalene, acrylonitrile, methacrylonitrile, methyl methacrylate, vinyl acetate, vinylidene chloride, methyl vinyl ketone, methyl vinyl ether, and similar unsaturated hydrocarbons, nitriles, esters, ketones, and ethers. These monomers are preferably employed in smaller amounts than the butadiene hydrocarbon.

The polymerization of the above materials in aqueous emulsion may be effected by various initiators of polymerization such as per-compounds including per-acids, peroxides, and per-salts such as persulfates, perborates, percarbonates, and the like, as well as other types of initiators such as diazoaminobenzene, and dipotassium diazomethane disulfonate.

Any of the ordinary emulsifying agents such as fatty acid soaps including sodium oleate and sodium stearate, hymolal sulfates and aryl sulfonates including sodium lauryl sulfate and sodium isopropyl naphthalene sulfonate, and salts of organic bases containing long carbon chains such as the hydrochloride of dimethylaminoethyl-oleylamide, trimethylcetylammonium methyl sulfate, etc., may be employed in the polymerization.

The terms "butadiene hydrocarbons" and "a butadiene hydrocarbon" signify butadiene-1,3 and its homologues which enter into polymerization reactions in substantially the same manner. The term "sulfide" is a generic term including the mono-, di-, and polysulfides.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:
1. A method which comprises polymerizing a butadiene hydrocarbon in the form of an aqueous emulsion in the presence of a compound containing the 2-thiothiazyl group.
2. The method which comprises polymerizing in the form of an aqueous emulsion a mixture of butadiene and a monomer copolymerizable therewith in aqueous emulsion in the presence of a compound containing the 2-thiothiazyl group.
3. The method which comprises copolymerizing in the form of an aqueous emulsion butadiene and a smaller amount of a monomer copolymerizable therewith in aqueous emulsion, in the presence of an aliphatic 2-mercaptothiazole.
4. The method which comprises copolymerizing butadiene and acrylonitrile in the form of an aqueous emulsion in the presence of an aliphatic 2-mercaptothiazole.
5. The method which comprises copolymerizing in the form of an aqueous emulsion butadiene and a smaller amount of a monomer copolymerizable therewith in aqueous emulsion, in the presence of 2-mercapto-4,5-dimethylthiazole.
6. The method which comprises copolymerizing in the form of an aqueous emulsion butadiene and a smaller amount of a monomer copolymerizable therewith in aqueous emulsion, in the presence of 2-mercapto-4-ethyl-thiazole.
7. The method which comprises copolymerizing in the form of an aqueous emulsion butadiene and a smaller amount of a monomer copolymerizable therewith in aqueous emulsion, in the presence of an aliphatic bis-thiazyl-2-sulfide.
8. The method which comprises copolymerizing butadiene and acrylonitrile in the presence of an aliphatic bis-thiazyl-2-disulfide.
9. A composition of matter prepared by the method of claim 1.
10. A composition of matter prepared by the method of claim 2.
11. A composition of matter prepared by the method of claim 3.
12. A composition of matter prepared by the method of claim 4.
13. A composition of matter prepared by the method of claim 7.
14. A composition of matter prepared by the method of claim 8.

CHARLES F. FRYLING.

Certificate of Correction

Patent No. 2,380,426.  July 31, 1945.

CHARLES F. FRYLING

It is hereby certified that errors appear in the printed specification of the above numbered patent requiring correction as follows: Page 2, second column, lines 5 and 6, for "dimethylaminoethyloleylamide" read *diethylaminoethyloleylamide*; line 23, claim 1, for "A method" read *The method*; and that the said Letters Patent should be read with these corrections therein that the same may conform to the record of the case in the Patent Office.

Signed and sealed this 9th day of July, A. D. 1946.

[SEAL]

LESLIE FRAZER,
*First Assistant Commissioner of Patents.*